United States Patent
Schütz et al.

(10) Patent No.: US 12,290,076 B2
(45) Date of Patent: May 6, 2025

(54) BAKING TRAY OR BAKING GRID HAVING A NON-STICK AND/OR NON-WETTING COATING, COOKING APPLIANCE COMPRISING SUCH A BAKING TRAY OR BAKING GRID AND METHOD FOR MANUFACTURING A BAKING TRAY OR BAKING GRID

(71) Applicant: ELECTROLUX APPLIANCES AKTIEBOLAG, Stockholm (SE)

(72) Inventors: Tobias Schütz, Rothenburg ob der Tauber (DE); Filippo Tisselli, Forli (IT); Klaus Wälzlein, Rothenburg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 147 days.

(21) Appl. No.: 17/776,841

(22) PCT Filed: Sep. 29, 2020

(86) PCT No.: PCT/EP2020/077245
§ 371 (c)(1),
(2) Date: May 13, 2022

(87) PCT Pub. No.: WO2021/094032
PCT Pub. Date: May 20, 2021

(65) Prior Publication Data
US 2022/0386627 A1    Dec. 8, 2022

(30) Foreign Application Priority Data

Nov. 15, 2019  (EP) .................................. 19209417
Apr. 7, 2020   (WO) ............... PCT/CN2020/083446

(51) Int. Cl.
*A21B 3/13* (2006.01)
*C23C 18/12* (2006.01)
(Continued)

(52) U.S. Cl.
CPC .............. *A21B 3/13* (2013.01); *C23C 18/122* (2013.01); *C23C 18/1225* (2013.01);
(Continued)

(58) Field of Classification Search
CPC ..... A21B 3/13; C23C 18/122; C23C 18/1225; C23C 28/321; C23C 28/345;
(Continued)

(56) References Cited

U.S. PATENT DOCUMENTS 6,656,425 B1    12/2003  Benthien
7,488,515 B2 *   2/2009  Groll .......................... C23C 4/18
                                                        427/515

(Continued)

FOREIGN PATENT DOCUMENTS

CA   2171315    3/1995
EP   0565941   10/1993
(Continued)

OTHER PUBLICATIONS

Supplemental European Search Report for application No. EP 20787420, dated Dec. 15, 2022, 11 pages.
(Continued)

*Primary Examiner* — Shawn M Braden
(74) *Attorney, Agent, or Firm* — Chrisman Gallo Tochtrop LLC

(57) ABSTRACT

The present invention relates to a baking tray (20) or baking grid, in particular a baking tray (20) for a cooking appliance (1), having a non-stick and/or non-wetting coating (12) obtainable by a process characterised by the following steps, a) providing a baking tray (20) or baking grid having a
(Continued)

surface, in particular having an upper surface (7*a*) and a bottom surface (7*b*), b) preferably, pretreating of the surface (7*a*, 7*b*) of the baking tray (20) or baking grid at least partially, in particular completely, for providing a surface having a roughness being suitable for applying a non-stick and/or non-wetting coating (12) by mechanical treatment, physical treatment or chemical treatment, in particular by sandblasting and/or laser treatment and/or a surface activation treatment, particularly a plasma treatment, and/or an enameling process to form a ground layer (13), c) applying the non-stick and/or non-wetting coating (12) to the pretreated surface (7*a*, 7*b*) of the baking tray (20) or baking grid or a surface (14*a*) of the ground layer (13), wherein the non-stick and/or non-wetting coating (12) comprises at least one layer (17) that is obtained by a sol-gel process from a first composition comprising a silica sol and a silane. The invention further relates to a cooking appliance (1), in particular a domestic oven comprising such a baking tray (20) or baking grid and a method for manufacturing such a baking tray (20) or baking grid.

23 Claims, 2 Drawing Sheets

(51) Int. Cl.
*C23C 28/00* (2006.01)
*F24C 15/00* (2006.01)
*F24C 15/12* (2006.01)
*C23D 5/04* (2006.01)

(52) U.S. Cl.
CPC .......... *C23C 28/321* (2013.01); *C23C 28/345* (2013.01); *F24C 15/005* (2013.01); *F24C 15/12* (2013.01); *C23C 18/1254* (2013.01); *C23D 5/04* (2013.01)

(58) Field of Classification Search
CPC .... C23C 18/1254; F24C 15/005; F24C 15/12; F24C 15/16; F24C 3/085; F24C 15/08; C23D 5/04; B05D 3/148; B05D 5/06; B05D 2202/10; B05D 2202/25; B05D 2350/63; B41M 1/04; B41M 1/12; B41M 1/26; B41M 1/28; B41M 1/34; B41M 5/0011
See application file for complete search history.

(56) References Cited

U.S. PATENT DOCUMENTS

| | | | |
|---|---|---|---|
| 8,778,455 | B2 | 7/2014 | Benford, Jr. |
| 9,074,778 | B2 | 7/2015 | Nall et al. |
| 9,151,504 | B2 * | 10/2015 | Lee .......... F24C 15/005 |
| 2004/0105985 | A1 * | 6/2004 | Henze ............ A47J 36/025 |
| | | | 428/689 |
| 2006/0182929 | A1 | 8/2006 | Joerdens |
| 2008/0032122 | A1 * | 2/2008 | Berrux .............. B05D 5/08 |
| | | | 428/335 |
| 2014/0238379 | A1 * | 8/2014 | Venkataramani ..... C04B 35/624 |
| | | | 427/387 |
| 2015/0144613 | A1 | 5/2015 | Guillemot et al. |
| 2015/0175814 | A1 * | 6/2015 | Aizenberg .......... C09D 5/1693 |
| | | | 427/2.24 |
| 2015/0219312 | A1 | 6/2015 | Llaluet |
| 2018/0073741 | A1 | 3/2018 | Kim et al. |
| 2018/0360263 | A1 * | 12/2018 | Ebbeke ............ A47J 36/02 |

FOREIGN PATENT DOCUMENTS

| | | |
|---|---|---|
| EP | 1757863 | 2/2007 |
| EP | 1767668 | 3/2007 |
| EP | 2177580 | 4/2010 |
| EP | 3293457 | 3/2018 |
| EP | 3399240 | 11/2018 |
| EP | 3428539 | 1/2019 |
| FR | 3025995 | 3/2016 |
| GB | 718132 | 11/1954 |
| GB | 1418842 | 12/1975 |
| JP | S61076828 | 4/1986 |
| JP | H0523253 | 2/1993 |
| JP | 2014148704 | 8/2014 |
| WO | 0059555 | 10/2000 |
| WO | 0202471 | 1/2002 |
| WO | 2004087223 | 10/2004 |
| WO | 2011056742 | 5/2011 |
| WO | 2012040605 | 3/2012 |
| WO | 2012085786 | 6/2012 |

OTHER PUBLICATIONS

International Search Report and Written Opinion for PCT/EP2020/077238, dated Nov. 27, 2020, 12 pages.
International Search Report and Written Opinion for PCT/EP2020/077239, dated Feb. 3, 2021, 12 pages.
International Search Report and Written Opinion for PCT/EP2020/077245, dated Feb. 3, 2021, 12 pages.
European Communication in related application No. 19168020.6 dated Nov. 29, 2024, 14 pages.
EP2177580 English translation from US examiner.

* cited by examiner

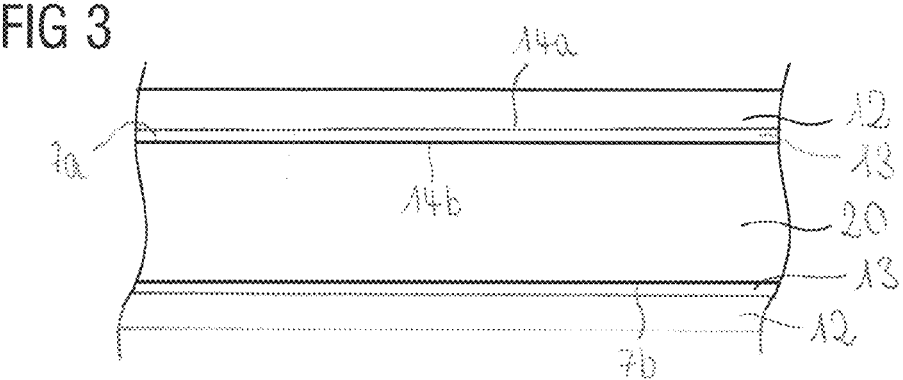
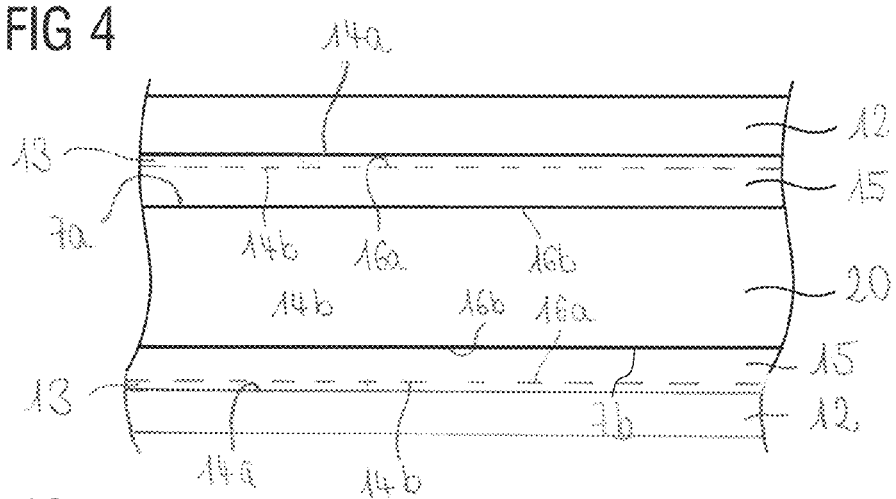
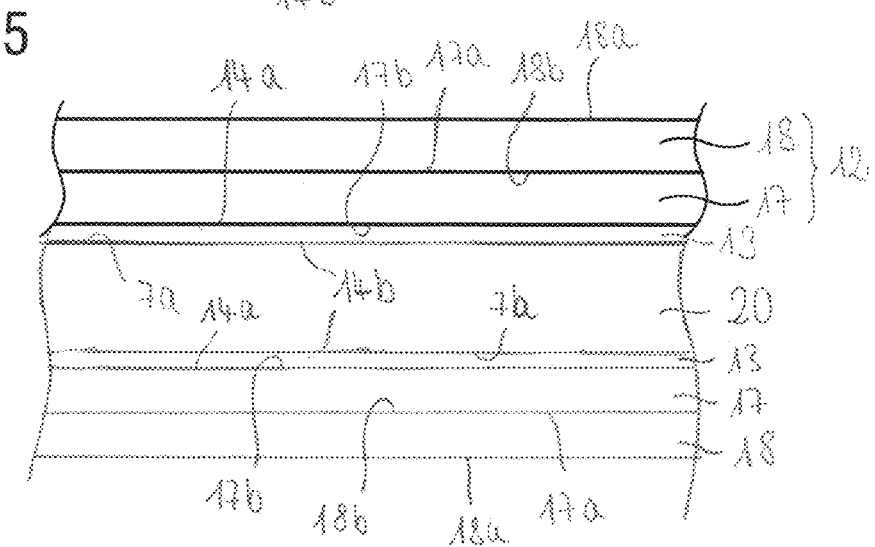

BAKING TRAY OR BAKING GRID HAVING A NON-STICK AND/OR NON-WETTING COATING, COOKING APPLIANCE COMPRISING SUCH A BAKING TRAY OR BAKING GRID AND METHOD FOR MANUFACTURING A BAKING TRAY OR BAKING GRID

This application claims priority benefit to European patent application No. EP19209417.5, filed on Nov. 15, 2019, and International patent application No. PCT/CN2020/083446, filed on Apr. 7, 2020, the disclosures of which are hereby incorporated by reference herein in their entirety.

TECHNICAL FIELD

The present invention relates to a baking tray or baking grid having a non-stick and/or non-wetting coating. In particular, the present invention relates to a baking tray or baking grid of a cooking appliance. Further, the present invention relates to a cooking appliance having such a baking tray or baking grid. Moreover, the present invention relates to a method for manufacturing a baking tray or baking grid, in particular a baking tray or baking grid of a cooking appliance, wherein the non-stick and/or non-wetting coating is applied to the baking tray or baking grid.

BACKGROUND

One problem for the customer is the cleaning of an oven and used components such as baking trays or baking grid after usage, especially after food items, such as cheese, sauces, oils, fat or the like, are burned onto the surface of the cavity, further components within the cavity or in particular insertable components like baking trays or baking grids that are in direct contact with the foodstuff during the cooking process. In particular such baking trays or baking grids are often dirty over large areas and therefore time-consuming to clean. Furthermore cleaning of baking trays or baking grids should be carried out each time when they have been used.

Baking trays or baking grids cannot be cleaned along with the cooking appliance and the cavity within so-called self-cleaning appliances with pyrolysis functionality, appliances with catalytic enamel or appliances with plasma treatment or steam-cleaning program but have to be removed from the oven cavity before starting such cleaning procedures. Therefore, baking trays or baking grids have to be cleaned separately by hand or by use of a dishwasher and it is desirable to facilitate said cleaning.

SUMMARY

It is an object of the present invention to provide a baking tray or baking grid, a cooking appliance comprising such a baking tray or baking grid and a method for manufacturing such a baking tray or baking grid, having improved properties, in particular with regard to cleaning behaviour, temperature resistance and/or surface hardness.

These and other problems are solved by the subject matter of the attached independent claims.

The first object of the present invention is achieved by a baking tray or baking grid (or: cooking good carrier) according to claim 1.

A baking tray or baking grid, in particular a baking tray or N baking grid for a cooking appliance, having a non-stick and/or non-wetting coating on a surface is obtainable by (or: prepared by) a process characterised by the following steps:

a) providing an uncoated baking tray or baking grid, in particular an essentially plate-shaped baking tray, having surface, in particular an upper surface and a bottom surface, b) pretreating the upper and/or bottom surface of the uncoated baking tray or the surface of the uncoated baking grid at least partially, in particular completely, for providing a surface having a roughness being suitable for applying a non-stick and/or non-wetting coating, by mechanical treatment, physical treatment or chemical treatment, in particular by sandblasting and/or laser treatment and/or an enamelling process to form a ground layer, thus applying an enamel layer onto the surface of the baking tray or the baking grid, c) applying the non-stick and/or non-wetting coating, directly or indirectly, to the pretreated surface of the baking tray or baking grid or the surface of the ground layer, wherein the non-stick and/or non-wetting coating comprises at least one layer that is obtained by a sol-gel process from a first composition comprising a silica sol and a silane.

In other words: The non-stick and/or non-wetting coating is a sol-gel coating. The at least one layer, hereinafter also referred to as base layer, is composed of a matrix comprising the condensation reaction product of a silica sol and a silane. Obtained by a sol-gel process from a first composition has therefore to be understood in such a way, that the first layer is obtained by means of hydrolysis and (poly-)condensation of an aqueous mixture comprising at least a silica sol and a silane. Thus, the starting materials of the first composition, namely at least silica sol, silane and water if needed, are mixed together and stirred. The mixture obtained thereof is then applied to the upper surface of the baking tray and dried to obtain the first layer. Such a coating having one layer is known for example from EP 2 177 580 B1.

The expression "non-stick" indicates a surface that resists adherence of food items, such as cheese, sauces, oils, fat or the like, what permits easy cleaning of the baking tray or baking grid. The expression "non-wetting" terms a surface that repels liquids, e.g. water. The property is evidenced by a large contact angle between a drop of water and the surface on which the drop rests, wherein a contact angle of at least 95 degree is desirable.

According to the present invention, however, the "upper surface" of baking tray or baking grid is the surface on which the foodstuff is placed and that is—once inserted into the cooking chamber—directed to an upper cavity wall of a cooking appliance. Accordingly, a "bottom surface" of a baking tray or baking grid is the surface facing away from the foodstuff and towards a bottom cavity wall of the cooking appliance. In particular, at least the upper surface and thus the surface that is in contact with foodstuff is provided with an non-stick and/or non-wetting coating, but even applying such a coating on the bottom surface and therefore on the entire surface of the baking tray or grid might be advantageous, for example, in the case of more than one baking tray is used within the cooking appliance at the same time so that food items from a "lower" baking tray might splash up.

According to the present invention, however, the expression "baking tray or baking grid" shall be largely understood as a cooking good carrier and shall cover all known forms and shapes of trays, grids, air fry grids or frying pans and the like that are well-known on the market, with or without any openings and different possibilities for mounting said baking tray or baking grid to a cooking appliance. For reasons of clarity, we mainly refer to baking trays in the following but the explanations apply in the same way to other types of cooking good carriers as mentioned before.

The idea of the present invention is to provide a baking tray or baking grid with an easy to clean effect whereby the contact angle of the surface shows more than 95 degrees. Applying a non-stick and non-wetting coating by a sol-gel process has the advantage that a burning process at high temperatures for applying a non-stick coating on the baking tray is not required what saves energy. Besides a good cleaning behaviour, said coating shows good abrasion-resistant and a great surface hardness what leads to an increased lifetime.

The adhesion of the non-stick and/or non-wetting coating to the surface of the baking tray may particularly depend on the surface roughness. The present inventors have surprisingly found that such pretreatment of the surface before applying the non-stick and/or non-wetting coating and particularly a roughening of the surface is advantageous for the adhesion properties of the non-stick and/or non-wetting coating. Without such pretreatment, particularly such roughening, the at least one layer, and any subsequent layer, of the non-stick and/or non-wetting coating may peel off. Therefore, an advantageous surface structure may reduce the risk of peel off of the non-stick and/or non-wetting coating and at the same time allow to reduce the amount of coating and thus decrease costs. However, a surface roughness, which is too high, may also be disadvantageous, as the adhesion of the coating may be not optimal and/or the amount of coating needed will be higher than necessary.

A pretreatment of the surface by laser may be particularly advantages in comparison to known sandblasting methods in that integration into other production equipment is possible, for example related to existing laser welding lines in oven cavities, where sandblasting equipment may need totally new equipment and specific housings, protections, or the like. Furthermore it is also advantageous in having no need of process material, like corundum powder usually applied in sandblasting. Furthermore, it is also advantageous in reducing dirt occurring during the treatment and further surface cleaning after pretreatment steps and/or before coating is advantageously reduced compared to standard sandblasting methods. Also reproducibility of surface parameter values are advantageously increased.

The person skilled in the art will recognize that various laser methods and laser equipment may be applied to achieve the described preferably surface roughness. By way of example, in a pretreatment step according to the present invention a laser of type CL100 can be applied with a focal width of 254 mm, a wave length of 1064 nm, and an optical system STAMP10 with suction removal. Thereby, the surface treatment speed may be adjusted according to the desired results and with methods well known to the person skilled in the art. For example such surface treatment speed may be approximately 10 $m^2$/sec or higher.

According to the invention, the surface of the baking tray might be at least partially, in particular completely, roughened and/or protected against corrosion by applying a ground layer by an enamelling process, thus by applying an enamel layer to the surface. The enamelling process in particular comprises applying an enamel powder onto the surface of the baking tray and heating the enamel powder for providing a ground layer with a surface having a roughness being suitable for applying the non-stick and/or non-wetting coating and/or being corrosion resistant. Such a ground layer is useful for all base materials in order to prepare the baking tray for subsequent coating, thus for providing a good wettability and clean surface to obtain good adhesion performances on the full surface and to avoid detachment of the non-stick and/or non-wetting coating.

Furthermore, said ground layer may provide corrosion resistance for the surface of the baking tray so that it also functions as a protective layer, in case of a baking tray made of a non-corrosive material itself. Therefore roughening the surface of the baking tray by an enamelling process is advantageous with regard to mechanical treatment like sandblasting or by laser treatment as just one single process step has to be carried out in order to form a surface that has a good roughness and is in particular additionally non-corrosive in comparison to apply a protective layer in a first step and to roughen the surface of the protective layer in a second step.

The baking tray can be made of different materials, the material being suitable for intended use, such as stainless steel or another material that is non-corrosive itself, for example aluminium or an aluminium alloy. The disadvantage of such baking trays is, however, that they are expensive. Therefore, in a preferred alternative, the baking tray is made of corrosive steel, particularly so-called low-carbon steel is a preferred material. An example for such commonly used low carbon steel typically contains a small percentage of carbon, approximately about 0.05 to 0.30% carbon.

In case of a baking tray made of corrosive material, the baking tray is preferably provided with (or: comprises) a protective layer (or: non-corrosive layer) that is applied to the surface of the baking tray at least partially, in particular completely, and wherein said protective layer is pretreated by sandblasting and/or laser treatment and/or an enamelling process, thus applying an enamel layer for providing a surface having a roughness being suitable for applying the non-stick and/or non-wetting coating and applying the at least one layer of the non-stick and/or non-wetting coating to said protective layer. For example, the surface of the baking tray is coated with such a protective layer by spray-painting.

This is due to the reason, that the non-stick and/or non-wetting coating itself does not protect the base material or substrate, thus the baking tray, from corrosion. Therefore, an additional corrosion protection layer is advantageous if the baking tray is made of any corrosive material so that the non-stick and/or non-wetting coating can also be used with base material or substrate that is corrosive itself. In case the base material is non-corrosive itself, thus the baking tray is manufactured from stainless steel or another non-corrosive material, the step of applying a protective layer for corrosion protection may be optional.

According to preferred embodiments, said protective layer is an enamel layer and/or an aluminium layer and/or a layer comprising aluminium.

Preferably the protective layer has a thickness between 50 and 250 µm, in particular between 100 and 200 µm.

The protective layer and/or the ground layer might be made of a so-called pyro or vitreous enamel that essentially consists of melted and fused glass powder. For applying said enamel layer to the baking tray, high burning temperatures from about 820 to 840° C. are needed.

Another kind of protective layer and/or ground layer might be made of an enamel having a low softening point between 450° C. and 560° C., respectively a low glass transition temperature, a so-called "low-temperature enamel". The softening point is defined as a temperature, respectively a temperature range, at which the material, e.g. the enamel turns from its hard and relatively brittle state into a molten or rubber-like state when temperature is increased. Therefore, said low-temperature enamel can be applied to the surface of the baking tray at lower burning temperatures. Said enamel is for example an aluminium enamel that comprises aluminium oxide.

Compositions of such conventional enamels are known for example from WO 02/02471 A1 or GB 718,132. WO 02/02471 A1 discloses an enamel composition for use in forming an enamel cover coat comprising a glass component comprising at least a first glass frit, comprising by weight from about 30% to about 45% $P_2O_5$, from about 20% to about 40% $Al_2O_3$ from about 15% to about 35% $Li_2O$ and $Na_2O$ and $K_2O$, up to about 15% $B_2O_3$, up to about 15% MgO and CaO and SrO and BaO and ZnO, up to about 10% $TiO_2$ and $ZrO_2$, and up to about 10% $SiO_2$. The glass component may also comprise a blend of at least a first glass frit and a second glass frit. GB 718,132 discloses alkali metal aluminium phosphate vitreous enamel frits.

Another kind of protective layer and/or ground layer might be made of a catalytic enamel, for example known from EP 0 565 941 A1, disclosing a catalytically active coating composition comprising an enamel frit, e.g. containing $SiO_2$, $B_2O_3$, $TiO_2$, $ZrO_2$, $P_2O_5$, $Fe_2O_3$, $Al_2O_3$, alkali metal oxides and alkaline earth metal oxides. The coating further comprises inert substances such as, for example, quartz, feldspar or alumina ared used and a plate-shaped substrate coated with one or more metal oxides as an oxidation catalyst. Another catalytic enamel is known for example from GB 1 418 842 disclosing a catalytically active enamel layer for a cooking appliances, wherein an oxide and/or mixed oxide of natural origin containing iron oxide and/or titanium oxide is added to an enamel frit containing typical silicates and oxides.

Furthermore, so-called ground coat compositions comprising generally a glassy component and an additive component might be used for forming the protective layer and/or the ground layer an providing the effect of a rough and binding surface. Such ground coats are for example described in U.S. Pat. No. 8,778,455 B2 and comprise a combination of one or more alkali oxides, such as $Na_2O$ or $Ka_2O$, one or more alkaline earth oxides, such as ZnO or BaO, and one or more various transition metal oxides, such as $Al_2O_3$, $SiO_2$, $TiO_2$, $ZrO_2$, $P_2O_5$ or $Co_2O_3$, as glassy component, and additive such as fluorine or $NO_2$.

According to a preferred embodiment, the ground layer, in particular the enamel layer obtainable by the enamelling process, has a layer thickness between 5 and 100 µm, in particular between 10 and 80 µm, more particularly between 20 and 50 µm. Typical enamel thickness is normally larger than 100 µm. Inventors have surprisingly found, that the enamel compositions mentioned above allow forming of the upper layers being thinner than before. Such thin layers further establish an improved heat transfer between the baking tray and the foodstuff.

For providing good adhesion properties of the non-stick and/or non-wetting coating, the surface is pretreated to provide a surface that has roughness being suitable for applying the non-stick and/or non-wetting coating. In a preferred embodiment a surface roughness of a surface of the baking tray and/or a surface of the ground layer and/or a surface of the protective layer achieved with such pretreatment step is between Ra 0.01 µm to 10.00 µm, more preferably between Ra 0.10 µm to 5.00 µm, still more preferably between Ra 0.20 µm to 5.00 µm, still more preferably between Ra 0.50 µm to 5.00 µm, still more preferably between Ra 2.00 µm to 5.00 µm, still more preferably between Ra 2.50 µm to 5.00 µm.

The present inventors have surprisingly found that such an advantageous roughness within the above limits further improves the adhesion of subsequent layers or of a first or any subsequent layers of the non-stick and/or non-wetting coating to the baking tray or the protective layer and/or the ground layer to reduce the risk of peel off of the coating and at the same time reduce costs as the amount of coating is reduced in a favorite manner.

In summary, a surface having such a good roughness can be obtained in particular by applying a ground layer of known enamels as mentioned before. Even mechanical, physical or chemical treatment, in particular laser treatment of the surface can be carried out to achieve required roughness.

A lower surface roughness—within the limits above mentioned—may be advantageous as the amount of non-stick and/or non-wetting coating can be reduced.

Preferably, a surface roughness is less than Ra 10.00 µm, preferably less than Ra 7.50 µm, more preferably less then Ra 5.00 µm.

A higher surface roughness—within the limits mentioned above—may be advantageous as this would improve adhesive capacity for the non-stick and/or non-wetting coating.

Preferably, a surface roughness is more than Ra 0.01 µm, preferably more than Ra 0.10 µm, more preferably more than Ra 0.20 µm, still more preferably more than Ra 0.50 µm, still more preferably more than Ra 1.00 µm, still more preferably more than Ra 2.00 µm.

The person skilled in the art knows various standard methods to determine the surface roughness value Ra. Particularly the surface roughness may be preferably determined in accordance with BS EN ISO 4287:2000 British standard, identical with the ISO 4287:1997 standard.

In a preferred embodiment, the ceramic non-stick and/or non-wetting coating comprises at least a first and a second layer, wherein the first layer is applied to the pretreated surface of the baking tray or the surface of the ground layer or the pretreated surface of the protective layer, and wherein the second layer is applied to the first layer, so that a baking tray comprising a coating having base layer and top layer is obtained.

Particularly, the second layer is obtained by a sol-gel process from a second composition comprising a silica sol, a silane and a siloxane, in particular a polydimethylsiloxane. Such a coating having at least a second layer is also known from EP 2 177 580 B1.

In other words: The second layer, hereinafter also referred to as top layer, is composed of a matrix comprising the condensation reaction product of a silica sol, a silane and a siloxane. Obtained by a sol-gel process from a second composition has therefore to be understood in such a way, that the second layer is obtained by means of hydrolysis and (poly-)condensation of an aqueous mixture comprising at least a silica sol, a silane and a siloxane. Thus, the starting materials of the second composition, namely at least silica sol, silane, siloxane and water if needed, are mixed together and stirred. The mixture obtained thereof is then applied to the upper surface of the first layer and dried to obtain the second layer.

Preferably, the silica sol is present in an amount of 15 to 70 wt %, in particular in an amount of 30 to 70 wt % and/or the silane is present in an amount of 2 to 70 wt %, in particular in an amount of 10 to 40 wt %, both in the first and/or the second composition and/or in the first and/or second layer.

In particular the silane in the first and/or the second composition and/or in the first and/or second layer is an organoalkoxysilane, in particular a methyltrimethyoxysilane and/or a fluoralkoxysilane.

The first and/or the second composition and/or in the first and/or second layer may comprise a catalyst, in particular an acidic catalyst, more preferably an organic compound containing one or more carboxyl groups and/or a mineral acid, e.g. hydrochloric acid, sulfuric acid or nitric acid. Different monocarboxylic or dicarboxylic acids like formic acid, acetic acid or oxalic acid may be mentioned here as an example for suitable catalysts.

It has been shown, that it is advantageous, if the catalyst is present in an amount of 0.1 to 5 wt %, in particular in an amount of 0.1 to 2 wt %, both in the first and the second composition and/or in the first and/or second layer. The catalyst generally acts as a catalyst in the hydrolysis and condensation reaction and prevents too slow crosslinking.

In another preferred embodiment, the first and/or the second composition and/or in the first and/or second layer comprise or comprises a solvent, in particular an organic solvent. Examples for organic solvents are alcoholic solvents, for example methanol, ethanol or propanol.

In particular, the solvent is present in an amount of 10 to 60 wt %, in particular in an amount of 10 to 40 wt %.

Like the second composition or second layer, the first composition or first layer may also comprise a siloxane in a preferred embodiment. Said siloxane is in particular a polydimethylsiloxane.

An advantageous amount of siloxane in the first composition or first layer as well as in the second composition or second layer is between 0.1 to 2 wt %.

In a preferred embodiment, the first composition or first layer and/or the second composition or second layer comprise or comprises pigments and/or dyes and/or filling materials and/or further additives. In particular, temperature resistant anorganic pigments are favourable.

In addition, water is added to the first composition and/or the second composition, if needed.

Besides mechanical functionality and easy-to-clean behaviour, baking trays or grids may also be provided with specific printing for applying product name and/or symbols. Is is desirable to apply such printings without need of removal of the coating in the areas of the printing and without worsen the cleanability of the baking tray. According to a preferred embodiment, the baking tray or baking grid comprises such a printing, wherein at least a part of an outer surface of the coating provides an activated surface area, in particular being activated by an activation process that increases the surface tension within the activated surface area compared to the remaining outer surface of the coating before the activation process or parts of the outer surface that are not activated. Said activation process is in particular activated by an activation process using plasma technology. The printing (or printing material) is then applied to the activated surface area, thus on those parts of the outer surface of the coating for or on which the activation process has been carried out. Application of the printing is in particular carried out by means of ink technology, such as serigraphy or tampography.

Thereby the baking tray comprises a printing, but still shows good cleaning behaviour. Performing the preliminary activation process on the coating increases locally the surface tension so that the coating shows good adhesion properties in said activated areas for subsequent applying of the printing. Said activation lasts for some days, allowing a convenient application of symbols or the like, in particular by using traditional ink technologies. As the printing is applied to the coating without need of removing parts of said coating, e.g. by laser treatment before, additionally corrosion issues are avoided.

A preferred embodiment is characterized by an activation process which is performed using plasma technology. Particularly, a plasma technology gun or pin is used, moving on or above the part of the exposed surface of the coating to be treated and performing the activation process passing over said area. The coating is essentially non polar and shows non-wetting properties. Due to the activation process within the plasma, polar groups are formed at the exposed surface of the coating that increase the wettability of its surface. Subsequently, the printing can adhere to the surface.

In order to perform a quick and cost-efficient treatment, the activation process may be performed by limiting to the area or areas receiving a printing. Hence, areas without any printing may be excluded from such treatment. In order to reach this target, the exposed surface of the coating is covered at least partially, thus blank or non-printed areas are covered before performing the activation process in order to limit the part of the exposed surface on which the activation process is performed, in particular by covering parts of the exposed surface by means of respective cover elements or cover means. Alternatively, the plasma technology gun or pin may be deactivated when passing over the blank or non-printed areas.

The second object of the present invention is achieved by a cooking appliance according to claim 18.

Such a cooking appliance comprises a heatable cavity (or: oven muffle) comprising at least one cavity wall (or: muffle wall) defining a cooking chamber for cooking foodstuff, a central opening for placing foodstuff into the cooking chamber, heating elements for heating said cavity, and a door for closing the cavity, in particular for closing the central opening of the cavity, and mounting grids and/or shelves being disposed at a left and a right cavity wall for positioning a baking tray or baking grid within the cooking chamber. The cooking appliance further comprises a baking tray according to the present invention that is mounted or can be mounted on mounting grids and/or shelves.

For example, a cooking appliance according to the present invention is a cooking and/or baking device for cooking and/or baking of foodstuff. Such cooking appliance, preferably a cooking and/or baking device, may particularly be a cooking appliance selected from the group comprising an oven, baking oven, microwave, steam-oven and steam-cooker.

The cooking appliance may comprise further technical components like a fan and/or components that are provided to be attached to the cavity walls, for example a fan cover. Even these further components may have a comparable structure to the baking tray, thus at least one surface of such accessory components may be pretreated by one of the methods mentioned above and coated with a ceramic non-stick and/or non-wetting coating comprising at least a first layer, wherein the first layer is obtained by a sol-gel process from a first composition comprising a silica sol and silane.

The components of the cavity, thus the cavity walls and/or further accessory components, may be integrally formed or may comprise several parts that are provided to be joined together to form a shaped structure, such as the heatable oven cavity, its frontframe or any component thereof.

Heating elements, e.g. tube heating elements or grill elements, can heat up the cavity upper surface up to 500° C. For the use of a non-stick and non-wetting coating, in particular a coating obtained by a sol-gel process being described herein, that is easy to clean, the maximum temperature needs to be below about 300 to 350° C.

The third object of the present invention is achieved by a method for manufacturing a baking tray or baking grid according to claim 19.

Such a method for manufacturing a baking tray having a non-stick and/or non-wetting coating on its surface comprises at least the following steps:

Firstly, an uncoated baking tray or baking grid having a surface, in particular having an upper surface and a bottom surface is provided.

Secondly, the surface of the baking tray or baking grid is at least partially, in particular completely pretreated by mechanical treatment, physical treatment or chemical treatment, in particular by sandblasting and/or laser treatment and/or an enamelling process to form a ground layer to provide a surface having a roughness being suitable for applying a non-stick and/or non-wetting coating.

In other words: Before applying the non-stick and/or non-wetting coating or—if useful—a protective layer to the baking tray, the surface of the uncoated baking tray on which the non-stick and/or non-wetting coating or the protective layer has to be applied is prepared, e.g. by cleaning and/or drying the surface of the baking tray and/or activating the surface, preferably by roughening the surface by sandblasting and/or laser treatment and/or an enamelling process to form a ground layer on the surface of the baking tray, in order to achieve better adhesion of the protective layer or the non-stick and/or non-wetting coating.

Regarding the pretreatment and roughening of the surface, we explicitly refer to the explanations and examples described with regard to the different methods and materials used for the different layers, in particular the different enamel compositions, described in the context of the protective and/or ground layer as well as composition of the non-stick and/or non-wetting coating described in the context of the baking tray.

Thirdly, at least one layer of the non-stick and/or non-wetting coating is applied to the pretreated surface of the baking tray or the surface of the ground layer.

According to a preferred embodiment, during the enameling process of the pretreatment, an enamel powder is applied onto the surface of the baking tray at least partially, in particular completely, and the enamel powder is heated for providing a ground layer with an upper surface having a roughness being suitable for applying the non-stick and/or non-wetting coating.

According to a preferred embodiment, a protective layer, in particular an enamel layer and/or an aluminium layer and/or a layer comprising aluminium, is applied to the surface of the baking tray and the protective layer is pretreated by sandblasting and/or laser treatment and/or an enamelling process to form a ground layer.

In other words: Before applying the non-stick and/or non-wetting coating to the surface of the protective layer, the surface of the protective layer is prepared, e.g. by cleaning and/or drying the surface and/or activating the surface, preferably by roughening the surface for example by mechanical treatment, in particular sandblasting, laser treatment or chemical treatment of the surface of the baking tray, in order to achieve better adhesion of the non-stick and/or non-wetting coating. Also preferred is even here, that the surface of the protective layer is made and/or roughened by an enameling process, in particular by applying a ground layer.

Thus the ground layer is applied to at least the upper surface of the baking tray by an enamelling process having a surface roughness between Ra 0.01 µm to 10.00 µm, more preferably between Ra 0.10 µm to 5.00 µm, still more preferably between Ra 0.20 µm to 5.00 µm, still more preferably between Ra 0.50 µm to 5.00 µm, still more preferably between Ra 2.00 µm to 5.00 µm, still more preferably between Ra 2.50 µm to 5.00 µm and/or a layer thickness between 5 and 100 µm, in particular between 10 and 80 µm, more particularly between 20 and 50 µm. Said properties can be achieved by using enamel compositions described before, thus conventional enamels, catalytic enamels or so-called ground compositions. We refer explicitly to the explanations and examples described in the context of the protective and ground layer of the baking tray.

In a preferred embodiment, the non-stick and/or non-wetting coating comprises a first and a second layer, wherein the first layer is applied to the surface of the baking tray or the surface of the ground layer or the pretreated surface of the protective layer, and wherein the second layer is applied to the first layer, so that a baking tray comprising a coating having base layer and top layer is obtained.

In order to apply a printing on the coated surface, according to a preferred embodiment, the method may comprise additionally the steps performing an activation process on at least a part of the outer surface of the coating in order to provide an activated surface area, wherein the activation process in particular increases the surface tension within the activated surface area, in particular performing an activation process by using plasma technology, and applying a printing to the activated surface area, in particular by means of ink technology.

Novel and inventive features of the present invention are set forth in the appended claims.

BRIEF DESCRIPTION OF THE DRAWINGS

The present invention will be described in further detail with reference to the drawings, in which FIG. 3 illustrates a cross-sectional view of the baking tray according to a first embodiment of the invention in detail, FIG. 4 illustrates a cross-sectional view of the baking tray according to a second embodiment of the invention in detail, FIG. 5 illustrates a cross-sectional view of the coating according to an embodiment of the invention in detail.

DETAILED DESCRIPTION

Figure 1:
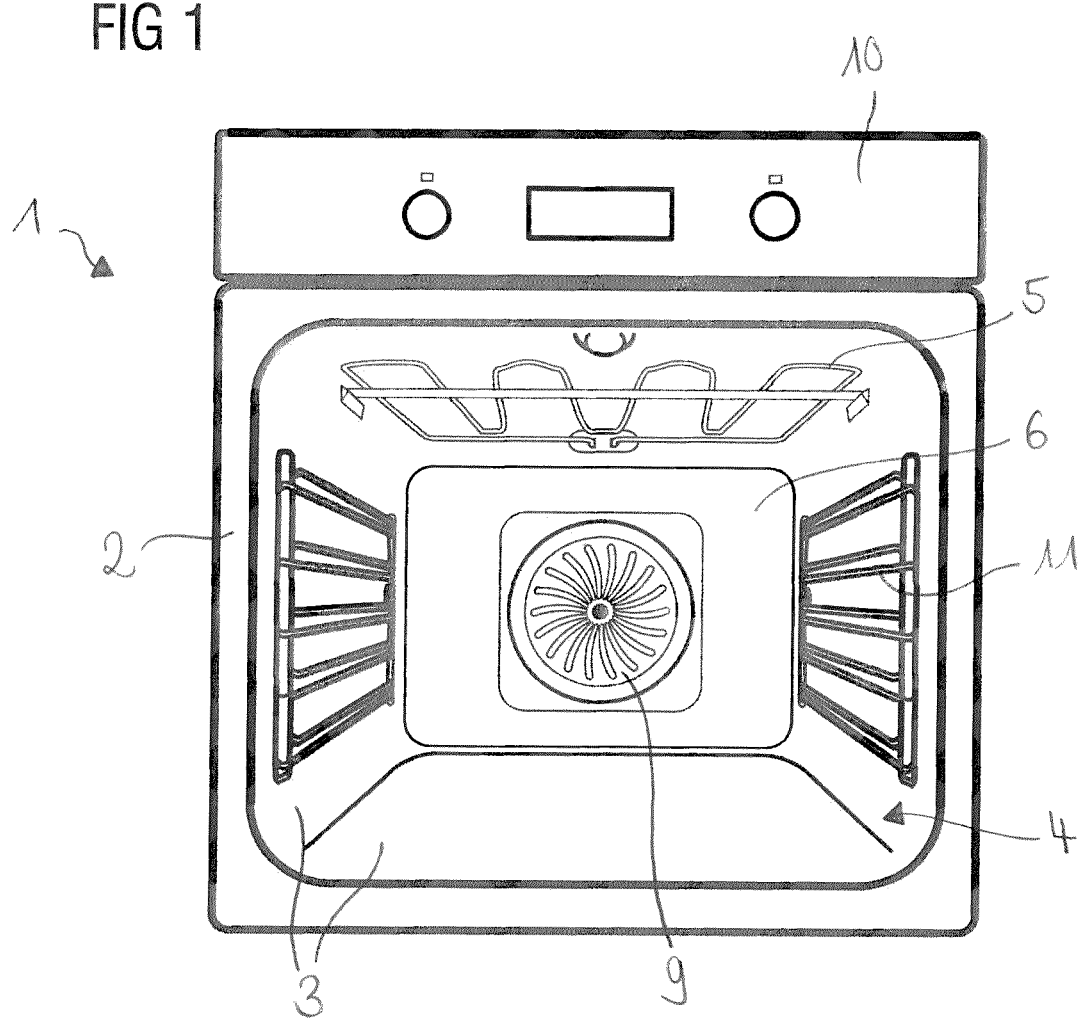
FIG. 1 illustrates a schematic view of a cooking appliance including a baking tray according to an embodiment of the present invention.

FIG. 1 illustrates a schematic view of a cooking appliance 1. Such cooking appliance 1 comprises a heatable cavity 2 having cavity walls 3 which define a cooking chamber 4 into which foodstuff may be placed for cooking or baking. The cooking chamber 4 is defined by the cavity walls 3, usually comprising a left and a right side wall, a bottom wall and an upper wall as well as a rear wall and a front wall. One of the cavity walls 3, usually the front wall (not shown in FIG. 1) comprises a central opening for placing the foodstuff into the cooking chamber 4. The central opening may be closed or opened by a door (not shown in FIG. 1) that may be a part of the front wall. The cooking appliance 1 usually further comprises also heating elements 5 presently disposed at the upper cavity wall of the cavity 2 for heating the cooking chamber 4 and therefore heating food that has been placed therein to be cooked. The cooking appliance 1 further comprises a fan cover 6 being disposed at the rear cavity wall of the cavity 2 in front of a fan 9 of the cooking appliance 1. The fan cover 6 is essentially plate shaped and comprises openings 8 for allowing a fluid to flow through. The fan cover 6 might for example be attached to the rear cavity wall by screws.

The cooking appliance 1 further comprises a control panel 10 with several operating and display elements, e.g. temperature display or oven setting knobs. Furthermore, mounting grids and shelves 11 are disposed at a left and a right cavity wall 3.

Figure 2:
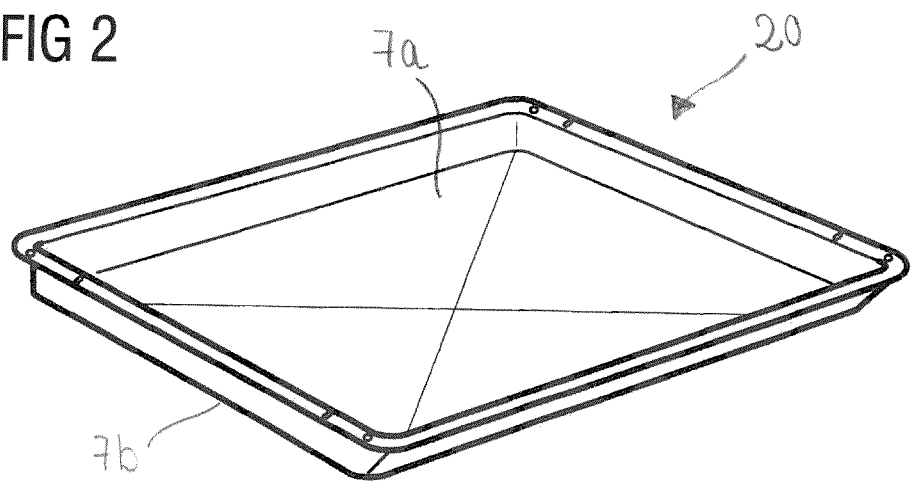
FIG. 2 illustrates a baking tray according to one embodiment in a perspective view.

A baking tray 20 can be mounted on said mounting grids and shelves 11 for inserting foodstuff into the oven cavity 2. The baking tray 20 can be made of a corrosive material, in particular corrosive steel, or an non-corrosive material, in particular stainless steel or aluminium. An exemplary embodiment of the invention in form of a baking tray 20 is shown in FIG. 2. The baking tray 20 comprises an upper surface 7a and a bottom surface 7b. Of course, the baking tray 20 may have other shapes of different design than shown in FIG. 2, or may be designed as a grid or may further include openings ("air-fry grids") as well as designed like further well-known variants of baking trays.

FIG. 3 shows a cross-sectional view of the baking tray 20 according to a first embodiment in which the layer structure can be seen. The baking tray 20 is obtained by a process wherein the entire surface, thus the upper surface 7a and the bottom surface 7b of the baking tray 20 is pretreated by an enamelling process to form a ground layer 13 formed by a ground coat composition that has burned to the baking tray 20 at temperatures of about 820° C. on said surface 7a, 7b. In general, the temperature for enamelling a ground enamel may be between 680 and 820° C., depending of the specific formulation of the ground enamel. In other words: The entire baking tray 20 is surrounded by the ground layer 13. Said ground layer 13 or, respectively, enamel layer, has an outer surface 14a facing away from the baking tray 20 and an inner surface 14b facing towards the baking tray 20 and shows a surface roughness Ra of about 2 to 3.5 µm at its upper surface 14a. The thickness of the ground layer 13 is about 20 µm. Ground layer 13 also shows corrosion resistant properties so that the baking tray 20 is protected against corrosion, what is in particular useful and necessary if said baking tray 20 is made of a corrosive material, for example a low carbon steel to save costs. Inventors have surprisingly found that such a small thickness and small roughness shows good adhesion properties that are sufficient for applying a non-stick and/or non-wetting coating 12 comprising at least one layer 17 that is obtained by a sol-gel process from a first composition comprising a silica sol and a silane and according to embodiments of the invention further components like solvents or additives in useful amounts as described before.

FIG. 4 shows a cross-sectional view of the baking tray 20 according to a second embodiment in which the layer structure can be seen. The baking tray 20 is presently made from a corrosive material so that a protective layer 15 is applied to the entire surface, thus the upper surface 7a and the lower surface 7b of the baking tray 20 before the pretreatment step for preventing the baking tray 20 from corrosion, the protective layer 15 having an outer surface 16a facing away from the baking tray 20 and an inner surface 16b facing towards the baking tray 20. Afterwards, for obtaining a baking tray 20 with a non-stick and/or non-wetting coating 12, said protective layer 15 is pretreated by sandblasting or laser treatment to achieve a surface roughness of the surface 16a of the protective layer between about 2 and 3.5 µm by sandblasting or a surface roughness smaller than fpm by laser treatment. Inventors have surprisingly found out that even though the surface roughness achieved by laser treatment is smaller, good adhesion behaviour can be achieved, probably due to more fine-grained structure in comparison with a sandblasted surface. The protection layer 15 has a layer thickness of about 150 µm. In particular in case that the protection layer 15 is an aluminium layer or a layer comprising aluminium, it might be useful to carry out an enamelling process to form a ground coat 13 on the surface 16a of the protective layer 15 (shown in dashed lines) to benefit from the good adhesive properties of an enamel layer made from a ground composition having a surface roughness between 2 to 3.5 µm.

FIG. 5 shows a cross-sectional view of the baking tray 20 according to a third embodiment, that differs from the first embodiment according to FIG. 3 in that the non-stick and/or non-wetting coating 12 comprises a first and a second layer 17, 18, wherein the first layer 17 is applied to the surface 14a of the ground layer 13 and wherein the second layer 18 is applied to the first layer 17. The second layer 18 is obtained by a sol-gel process from a second composition comprising a silica sol, a silane and a siloxane. Both layers 17, 18 have an outer surface 17a, 18a facing away from the baking tray 20 and an inner surface 17b, 18b facing towards the baking tray 20.

As a matter of course, even a baking tray 20 according to the second embodiment shown in FIG. 4 might have a non-stick and/or non-wetting coating 12 comprising a first and a second layer 17, 18, wherein the first layer 17 is applied to the surface 16a of the protective layer 15 and wherein the second layer 18 is applied to the first layer 17.

Both, the first layer 17 and, if present, the second layer 18 are obtained by a sol-gel process. For production of the first layer 17, a colloidal silica sol, which is pure $SiO_2$, an organoalkoxysilane, which is an organic-inorganic hybrid material and presently methyltrimethyoxysilane, and an acid catalyst, presently acetic acid are mixed and stirred for about 2 hours at room temperature in order to effect a condensation reaction. The weight proportion of organoalkoxysilane is about 10 to 40 wt %, silica sol is present in an amount of 30 to 70 wt %. Adding acetic acid in an amount of 0.1 to 2 wt % is sufficient for accelerating the condensation reaction.

Then, a solvent, presently propanol, is added in an amount of 10 to 40 wt %. Pigments are added and further additives can be additionally added at this step.

For production of the second layer 18, colloidal silica sol, siloxane and a solvent, even here propanol, are mixed. Organoalkoxysilane and an acid catalyst, presently acetic acid are then added. Even said mixture is mixed and stirred for about 2 hours at room temperature. The weight proportion of organoalkoxysilane is about 10 to 40 wt %, silica sol is present in an amount of 30 to 70 wt %, acetic acid is present in an amount of 0.1 to 2 wt %. Siloxane, presently polydimethylsiloxane, is added in an amount of 0.1 to 2 wt %.

Then, a solvent, presently even here propanol, is added in an amount of 10 to 40 wt %. Pigments are added and further additives can be additionally added at this step.

For manufacturing a baking tray 20 having a non-stick and/or non-wetting coating 12 on its surface 7a, 7b a baking tray 20 having an upper surface 7a, an bottom surface 7b is provided. In a further step, the surface 7a, 7b of the baking tray 20 is pretreated in order to provide good adhesion properties and surface roughness for subsequent apply of the non-stick and/or non-wetting coating 12 (FIG. 3). Additionally or in an alternative, a protective layer 15 is applied to the surface 7a, 7b of the baking tray 20 and said protective layer 15 is pretreated (FIG. 4). Pretreatment of the surface 7a, 7b of the baking tray 20 or, if present, the surface 16a, 16b of the protective layer 15 is carried out in particular by sandblasting, laser treatment or an enamelling process for forming a ground layer 13.

The enamelling process is in particular carried out by applying an enamel powder onto the upper surface 7a of the baking tray 20 and/or onto the surface 16a, 16b of the protective layer 15, and heating the enamel powder for providing a ground layer 13 with a surface 14a having a roughness being suitable for applying the non-stick and/or non-wetting coating 12.

Afterwards, at least one layer of the non-stick and/or non-wetting coating 12 is applied to the upper surface 7a of the baking tray 20 or, if present, to the upper surface 16a of the protective layer 15 or the surface 14a of the ground layer 13.

In case of applying a non-stick and/or non-wetting coating 12 comprising at least two layers 17, 18 (FIG. 5), the first layer 17 is applied to the surface 7a, 7b of the baking tray 20 or the surface 14a of the ground layer 13 or the surface 16a of the protective layer 15, and the second layer 18 is applied to the first layer 17.

The present invention, thus a baking tray 20 having a non-stick and/or non-wetting coating 12 and a baking tray 20 having such a coating 12 shows an improved cleaning behaviour. The coating 12 is abrasion-resistant and shows a greater surface hardness what leads to an increased lifetime. Furthermore, the coating 12 has shown a good adhesion properties on the baking tray 20, in particular on the surface 14a of the ground layer 13 or the surface 16a of the protective layer 15. As the coating 12 is produced by a sol-gel process, a (second) burning step at high temperatures is not necessary.

The baking tray 20 may further comprise a printing (not shown) that is applied, in particular by ink technology, to the surface of the coating 12, in particular to a surface area that has been activated by using plasma technology in order to increase the surface tension.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS 1 cooking appliance
2 cavity
3 cavity wall
4 cooking chamber
5 heating element
6 fan cover
7a upper surface of the baking tray
7b bottom surface of the baking tray
8 openings
9 fan
10 control panel
11 mounting grids and shelves
12 non-stick and/or non-wetting coating
13 ground layer
14a surface of the ground layer
14b bottom surface of the ground layer
15 protective layer
16a inner surface of the protective layer
16b outer surface of the protective layer
17 first layer of the non-stick and/or non-wetting coating
17a inner surface of the first layer
17b outer surface of the first layer
18 second layer of the non-stick and/or non-wetting coating
18a outer surface of the second layer
18b inner surface of the second layer
20 baking tray

The invention claimed is:

1. A coated baking tray or baking grid having a non-stick and/or non-wetting coating produced by a process comprising the following steps:
 a) providing a baking tray or baking grid having an upper surface and a lower surface,
 b) pretreating the surface upper surface and/or the lower surface of the baking tray or baking grid to yield a pretreated baking tray or baking grid having a surface with a surface roughness suitable for applying a non-stick and/or non-wetting coating, the baking tray or baking grid being pretreated by mechanical treatment, physical treatment, or chemical treatment,
 c) applying the non-stick and/or non-wetting coating to the surface of the pretreated baking tray or baking grid, wherein the non-stick and/or non-wetting coating comprises at least one layer that is obtained by a sol-gel process from a first composition comprising a silica sol and a silane,
 wherein the baking tray or baking grid is pretreated to form a ground layer, the ground layer being an enamel layer having a layer thickness between 10 and 80 µm.

2. The coated baking tray or baking grid according to claim 1, wherein the baking tray or baking grid is made of a corrosive material or a non-corrosive material.

3. The coated baking tray or baking grid according to claim 1, wherein the step of pretreating the baking tray or baking grid includes applying a protective layer to the upper surface and/or the lower surface of the baking tray or baking grid, and pretreating said protective layer by sandblasting and/or laser treatment such that the protective layer provides the surface having a roughness suitable for applying the non-stick and/or non-wetting coating.

4. The coated baking tray or baking grid according to claim 3, wherein the protective layer is an enamel layer and/or an aluminium layer and/or a layer comprising aluminium.

5. The coated baking tray or baking grid according to claim 3, wherein the protective layer has a thickness between 50 and 250 µm.

6. A coated baking tray or baking grid having a non-stick and/or non-wetting coating produced by a process comprising the following steps:
 a) providing a baking tray or baking grid ha an upper surface and a lower surface,
 b) pretreating the surface upper surface and/or the lower surface of the baking tray or baking grid to yield a treated baking tray or baking grid having a surface with a surface roughness suitable for applying a non-stick and/or non-wetting coating, the baking tray or baking grid being pretreated by mechanical treatment, physical treatment, or chemical treatment,
 c) applying the non-stick and/or non-wetting coating to the surface of the pretreated baking tray or baking grid, wherein the non-stick and/or non-wetting coating comprises at least one layer that is obtained by a sol-gel process from a first composition comprising a silica sol and a silane, wherein the surface of the pretreated baking tray or baking grid has a surface roughness between Ra 0.01 μm to 10.00 μm.

7. The coated baking tray or baking grid according to claim 1, wherein the non-stick and/or non-wetting coating comprises at least a first layer and a second layer, wherein the first layer of the non-stick and/or non-wetting coating is applied to the surface of the pretreated baking tray or baking grid, and wherein the second layer of the non-stick and/or non-wetting coating is applied to the first layer of the non-stick and/or non-wetting coating.

8. The coated baking tray or baking grid according to claim 7, wherein the second layer of the non-stick and/or non-wetting coating is obtained by a sol-gel process from a second composition comprising a silica sol, a silane and a siloxane.

9. The coated baking tray or baking grid according to claim 1, wherein the silica sol is present in an amount of 15 to 70 wt % and/or the silane is present in an amount of 2 to 70 wt %, within the first composition.

10. A coated baking tray or baking grid having a non-stick and/or non-wetting coating produced by a process comprising the following steps:
 a) providing a baking tray or baking grid having an upper surface and a lower surface,
 b) pretreating the surface upper surface and/or the lower surface of the baking tray or baking grid to yield a pretreated baking tray or baking grid having a surface with a surface roughness suitable for applying a non-stick and/or non-wetting coating, the baking tray or baking grid being pretreated by mechanical treatment, physical treatment, or chemical treatment,
 c) applying the non-stick and/or non-wetting coating to the surface of the pretreated baking tray or baking grid, wherein the non-stick and/or non-wetting coating comprises at least one layer that is obtained by a sol-gel process from a first composition comprising a silica sol and a silane,
 wherein the silane is an organoalkoxysilane and/or a fluoralkoxysilane.

11. The coated baking tray or baking grid according to claim 1, wherein the first composition comprises an organic solvent, and/or an acidic catalyst.

12. The coated baking tray or baking grid according to claim 11, wherein the solvent is present in said first composition in an amount of 10 to 60 wt %, and/or the catalyst is present in said first composition in an amount of 0.1 to 5 wt %.

13. A coated baking tray or baking grid having a non-stick and/or non-wetting coating produced by a process comprising the following steps:
 a) providing a baking tray or baking grid having an upper surface and a lower surface,
 b) pretreating the surface upper surface and/or the lower surface of the baking tray or baking grid to yield pretreated baking tray or baking grid having a surface with a surface roughness suitable for applying a non-stick and/or non-wetting coating, the baking tray or baking grid being pretreated by mechanical treatment, physical treatment, or chemical treatment,
 c) applying the non-stick and/or non-wetting coating to the surface of the pretreated baking tray or baking grid, wherein the non-stick and/or non-wetting coating comprises at least one layer that is obtained by sol-gel process from a first composition comprising a silica sol and a silane,
 wherein the first composition comprises a siloxane.

14. The coated baking tray or baking grid according to claim 8, wherein the siloxane is present in said first composition in an amount of 0.1 to 2 wt %.

15. The coated baking tray or baking grid according to claim 1, wherein the first composition comprises pigments and/or dyes and/or filling materials and/or further additives.

16. The coated baking tray or baking grid according to claim 1, wherein at least a part of an outer surface of the non-stick and/or non-wetting coating provides an activated surface area activated by an activation process that increases surface tension within the activated surface area using plasma technology, and wherein a printing is applied to the activated surface area by means of ink technology.

17. A cooking appliance comprising:
 a heatable cavity, comprising at least one cavity wall defining a cooking chamber for cooking foodstuff and a central opening for placing foodstuff into the cooking chamber,
 heating elements for heating said cavity,
 a door for closing the central opening of the cavity,
 mounting grids and/or shelves disposed at a left cavity wall and a right cavity wall, and the coated baking tray or baking grid according to claim 1 mounted or mountable on said mounting grids and/or shelves.

18. A method for manufacturing a coated baking tray or baking grid of a cooking appliance, having a non-stick and/or non-wetting coating on a surface thereof, comprising the following steps:
 providing a baking tray or baking grid having an upper surface and a lower surface,
 pretreating the upper surface and/or the lower surface of the baking tray or baking grid by mechanical treatment, physical treatment or chemical treatment to yield a pretreated baking tray or baking grid, wherein the step of pretreating the upper surface and/or the lower surface of the baking tray or baking grid includes applying a protective layer comprising enamel and/or aluminium to the upper surface and/or the lower surface of the baking tray or baking grid, and pretreating a surface of the protective layer by sandblasting and/or laser treatment and/or an enameling process, and
 applying at least one layer of the non-stick and/or non-wetting coating to the pretreated baking tray or baking grid.

19. The method for manufacturing the coated baking tray or baking grid according to claim 18, wherein the step of pretreating the upper surface and/or the lower surface of the baking tray or baking grid includes applying an enamel powder onto the surface of the protective layer, and heating the enamel powder to provide a surface with a roughness suitable for applying the non-stick and/or non-wetting coating.

20. The method for manufacturing the coated baking tray or baking grid according to claim 18, wherein the non-stick and/or non-wetting coating comprises a first layer and a second layer, wherein the first layer of the non-stick and/or non-wetting coating is applied to the pretreated baking tray or baking grid, and wherein the second layer of the non-stick and/or non-wetting coating is applied to the first layer of the non-stick and/or non-wetting coating.

21. The method for manufacturing the coated baking tray or baking grid according to claim 18, further comprising the following steps:
 performing an activation process using plasma technology on at least a part of an outer surface of the non-stick and/or non-wetting coating in order to provide an activated surface area, wherein the activation process increases surface tension within the activated surface area, applying a printing to the activated surface area by means of ink technology.

22. The coated baking tray or baking grid according to claim 1, wherein:

the pretreated baking tray or baking grid comprises:

the baking tray or baking grid made of low-carbon steel and having a fan-grid- or tray surface roughened by sand-blasting or by laser treatment to achieve a first surface roughness of Ra 0.01 μm to 10.00 μm according to ISO 4287:1997;

a protective layer applied over the fan-grid- or tray surface, said protective layer comprising a non-corrosive material selected from enamel and aluminum and having a thickness between 50 μm and 250 μm, said protective layer having an outer surface facing away from said baking tray or baking grid; and a ground layer comprising enamel applied to said outer surface of said protective layer, the ground layer having an outer surface facing away from said protective layer that has a second surface roughness up to about 3.5 μm according to ISO 4287:1997 provided by sand-blasting or by laser treatment of the outer surface of said ground layer; and the non-stick and/or non-wetting coating comprises:

a first non-stick, non-wetting solgel coating layer deposited on the outer surface of said ground layer, said first non-stick, non-wetting solgel coating layer having been deposited as the first composition comprising 30 wt. % to 70 wt. % silica sol and 10 wt. % to 40 wt. % silane that underwent a first condensation reaction therebetween to yield the first non-stick, non-wetting solgel coating layer; and a second non-stick, non-wetting solgel coating layer deposited on an outer surface of said first non-stick, non-wetting solgel coating layer, said second non-stick, non-wetting solgel coating layer having been deposited as a second composition comprising 30 wt. % to 70 wt. % silica sol, 10 wt. % to 40 wt. % silane, and 0.1 wt. % to 2 wt. % siloxane that underwent a second condensation reaction therebetween to yield the second non-stick, non-wetting solgel coating layer; said second non-stick, non-wetting solgel coating layer having an outer surface configured to support foodstuff for cooking in-use, the outer surface of said second non-stick, non-wetting solgel coating layer having an activated surface area that has been activated using plasma technology, and a printing applied to the activated surface area by ink technology, said activated surface area having a water-contact angel of at least 95°.

23. The coated baking tray or baking grid according to claim 1, wherein the coated baking tray or baking grid is temperature tolerant up to about 300° C.

\* \* \* \* \*